May 22, 1973  C. E. THOMAS  3,734,995
METHOD OF FORMING AN INSULATED FEED-THROUGH SEAL
Filed Nov. 18 1971
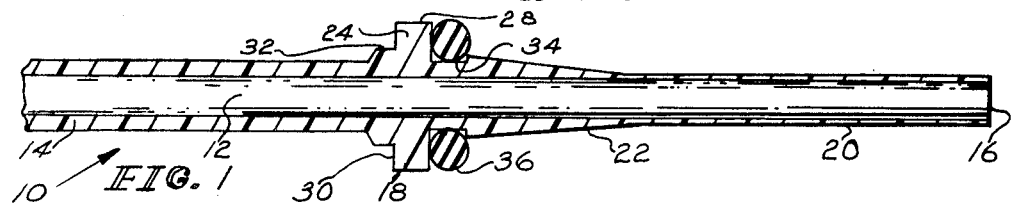
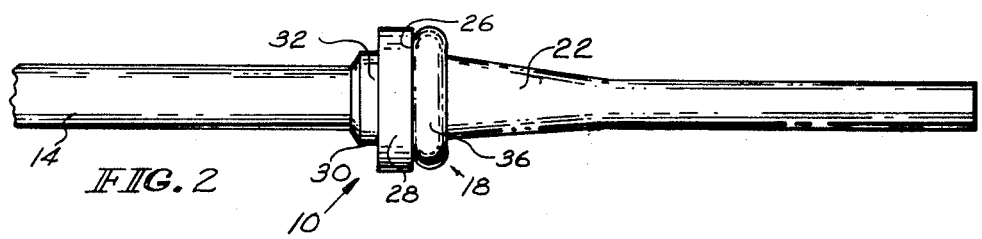
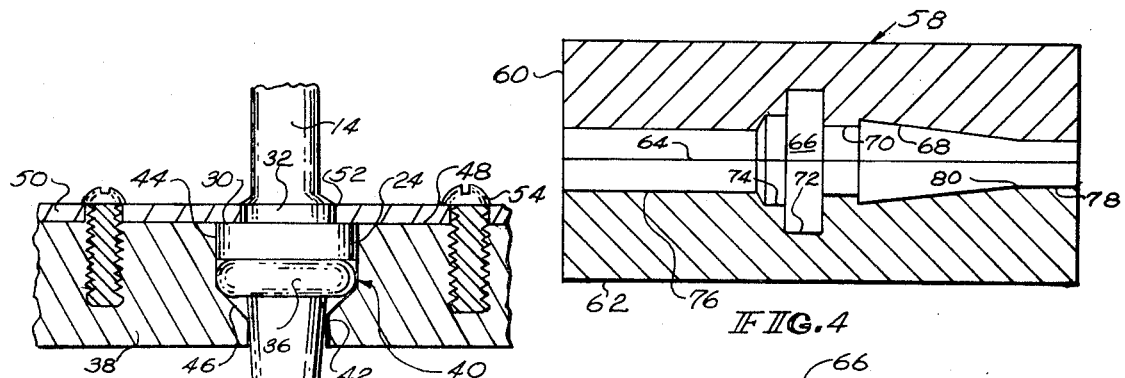
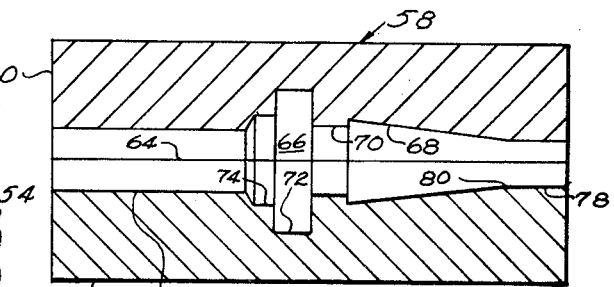
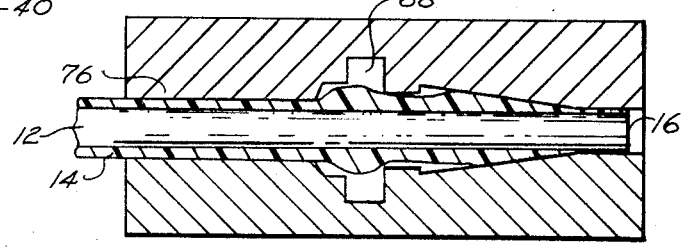
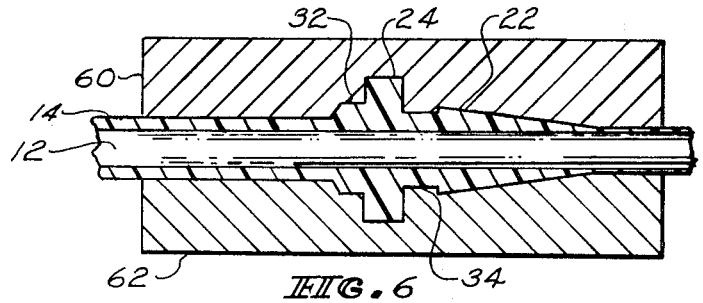
INVENTOR
CHAS E. THOMAS
BY
ATTORNEYS

United States Patent Office 3,734,995
Patented May 22, 1973

3,734,995
METHOD OF FORMING AN INSULATED FEED-THROUGH SEAL
Chas E. Thomas, Cement City, Mich., assignor to Sparton Corporation, Jackson, Mich.
Filed Nov. 18, 1971, Ser. No. 200,103
Int. Cl. B29c 17/00; H01b 17/30
U.S. Cl. 264—322                                    3 Claims

ABSTRACT OF THE DISCLOSURE

A sheathed electrical conductor adapted to extend through a plate or panel in a sealed condition, and electrically insulated therefrom, wherein the sheath of dielectric insulation defined on the conductor homogeneously forms sealing and orientation structure. The conductor includes a metallic core surrounded by a thermoplastic dielectric sheath wherein the sheath is heated and molded to homogeneously define the sealing structure. An O-ring is employed in conjunction with the molded structure for sealing cooperation with the panel. The invention contemplates a method of manufacturing an electrical conductor in accord with the invention whereby the sealing structure homogeneously formed of the conductor sheath material may be created by heating a portion of the conductor and inserting the same into a die to form the desired configuration by extrusion and molding.

BACKGROUND OF THE INVENTION

The invention pertains to the art of holding and sealing electrical conductors with respect to plates or panels through which the conductors pass.

In the construction of electrical products it is often necessary to pass electrical conductors through a housing wall or panel in such a manner that the conductor will be insulated from the panel, yet will be supported thereby, and an airtight or fluid tight seal is desired at the location the conductor passes through the panel.

In order to accomplish this purpose a wide variety of devices are available. For instance, fittings utilizing interconnected threaded members compressing resilient glands and packing rings are often employed in order to insure a firm yet sealed relationship in this type of application. Such packing and sealing glands are effective, and permit the conductors to be assembled to and removed from the panels through which they extend, but the presence of the rather complicated threaded and gland fittings makes such arrangements expensive, and relatively large in configuration.

Other systems for inserting conductors through plates, panels, bulkheads and the like may be in the form of deformable rivet type members with an annular configuration which are received in holes in the plate, and have the conductor inserted therethrough. Thereupon, the rivet or sealing member is deformed into firm engagement with the panel hole and conductor. While this type of sealing device may be economically manufactured, and may be of a relatively concise configuration, the deformation necessary to produce the sealing action prevents the conductor from being removed from the plate, once installed, and special tools and equipment are required for installation.

The simplest manner for sealing and supporting an electrical conductor passing through a hole in a plate or panel is to apply a sealant material to the plate, conductor and hole which seals the voids and spaces therebetween. By using a hardenable sealant a mechanical interconnection can be achieved of moderate strength, but extreme care must be utilized in the placement of the sealant in order to insure an airtight or watertight seal. With this type of system removal of the conductor from the plate can only occur when the sealant is broken, and to reinsert the conductor into the plate hole it is necessary to clean the conductor and plate of prior sealant in order to insure clean surfaces for subsequent sealing.

SUMMARY OF THE INVENTION

It is an object of the invention to provide a sealing system for electrical conductors, and a method for forming the sealing structure, wherein simplified and economical sealing means are readily defined on electrical conductors having a thermoplastic dielectric sheath. Sealing structure constructed in accord with the invention is of a concise configuration, may be readily usable by unskilled persons to create effective sealed connections, and the conductor may be readily removed from the associated supporting hole, and reinstalled, many times without adversely affecting the efficiency of the seal.

In the practice of the invention the conductor with which the inventive concept is employed consists of a metallic core encompassed within a dielectric sheath having thermoplastic characteristics. The core may constitute a solid wire conductor, or may be stranded wire. However, the formation of the sealing structure in accord with the invention is most readily accomplished with solid core wire due to its greater ability to transmit axial forces without deformation for a given size wire. The sheath material may be of any acceptable composition which has thermoplastic characteristics, and wherein the material is capable of retaining a molded configuration at room temperatures.

In essence, the invention contemplates the formation of an annular flange, boss and recess upon the conductor from the sheath material itself wherein such radially extending features constitute sealing means for cooperation with the plate or panel through which the conductor extends. In the preferred embodiment, a resilient O-ring is inserted upon the conductor adjacent a radially extending flange wherein the O-ring augments sealing with respect to the supporting plate.

An electrical conductor having sealing structure defined thereon in accord with the invention may be readily formed in a simplified manner. Such formation consists of heating the end of a standard electric wire conductor having a thermoplastic sheath of normal uniform radial thickness to a temperature wherein the sheath material may be molded. Upon heating the end region of the conductor with a hot air blast, for instance, the end of the conductor may be inserted into a mold which includes a cavity, and an opening located on the other side of the cavity with respect to the direction of conductor insertion into the mold. As the conductor is inserted into the mold and received within the opening, the fact that the opening is only slightly larger than the conductor core, but smaller than the diameter of the sheath, causes the sheath material to accumulate around the opening building up a sheath material mass within the cavity. The greater the length of conductor inserted into the mold, the more the build-up of sheath material in the mold cavity, and insertion of the conductor into the mold continues until sufficient sheath material is accumulated within the cavity to fill the same and define the desired sealing structure configuration on the conductor. Thereupon the sheath material is cooled so as to retain the molded configuration.

The plate or panel through which the conductor extends includes a hole adapted to cooperate with the sealing structure homogeneously defined on the conductor, and a clamp attached to the plate includes structure adapted to engage the sealing structure of the conductor and maintain the conductor in the desired relationship to the plate. Removal of the clamp permits removal of the conductor from the plate, and as the clamp may be of a configuration similar to the plate, the presence of the clamp does not create excessive bulk or assembly problems.

The homogenous construction of a flange, boss and recess on the conductor formed of the sheath material insures an integral relationship between the sealing structure and the sheath, and upon establishing a sealing engagement between the flange and panel an effective seal is assured. Also, the utilization of the homogeneous formation of the sealing structure on the conductor decreases cost of manufacture, and the molding of the sealing structure insures uniform dimensional characteristics.

BRIEF DESCRIPTION OF THE DRAWINGS

The aforementioned advantages of the invention will be appreciated from the following description and accompanying drawings wherein:

FIG. 1 is an elevational, diametrically sectional view of an electrical conductor formed in accord with the invention, an O-ring seal being illustrated in position thereon, FIG. 2 is an elevational view of the conductor of FIG. 1, FIG. 3 is an elevational, sectional view of a conductor constructed in accord with the invention as shown related to a plate through which it extends, a clamp being mounted upon the plate and cooperating with the conductor sealing structure, FIG. 4 is an elevational, sectional view of a two-part mold used in the formation of a conductor practicing the concepts of the invention, FIG. 5 is an elevational, sectional view of the mold and conductor during partial formation of the conductor sealing structure, and FIG. 6 is an elevational, sectional view similar to FIG. 5 illustrating complete forming of the conductor, and prior to removal from the mold.

DESCRIPTION OF THE PREFERRED EMBODIMENT

The configuration of an insulated feed-through seal electrical conductor formed in accord with the invention is best appreciated from FIGS. 1 and 2. The electrical conductor 10 includes a metal core 12, such as of solid copper wire, surrounded by a sheath 14 of substantially uniform radial thickness. The sheath 14 may be formed of a synthetic plastic material and is of a thermoplastic nature. Conventional electric wire is preferably used in the practice of the invention in that such wire is inexpensively available, and many common electric wire conductors available include dielectric thermoplastic sheath material. Thus, it will be appreciated that the practice of the invention does not require special electrical conductors having unusual characteristics.

The conductor end is represented at 16, and the formation of the sealing structure 18 upon the conductor in accord with the invention takes place at a region closely located to the conductor end for reasons as will be later appreciated. The conductor sheath adjacent the end 16 will be of a thin radial dimension at 20, or the sheath material may be completely stripped from the core 12 at this location, if desired.

The sealing structure 18 is of a conical configuration at 22 defining a conical surface diverging from the conductor end 16. An annular flange or projection 24 is defined on the conductor having a flat radial surface 26 disposed toward the conductor end, a cylindrical peripheral surface 28, and a flat radial surface 30 disposed on the opposite side of the flange with respect to the surface 26. The cylindrical boss 32 is located adjacent surface 30 and is also adjacent the normal thickness of sheath material 14, and it will be appreciated that the diameter of the boss 32 is greater than that of the normal sheath material, and the diameter of the surface 28 is greater than that of the boss.

An annular recess or groove 34 is defined in the sealing structure 18 adjacent the flange surface 26. The groove 34 serves to receive an annular O-ring 36 seal formed of rubber or neoprene, and the dimension of the ring 36 is such that its maximum diametrical portion is substantially in axial alignment with the peripheral surface 28.

The placing of the O-ring 36 upon the conductor 10 within the recess 34 firmly maintains the O-ring upon the sealing structure in that the radius of the recess is slightly greater than the normal diameter of the opening in the ring such that the O-ring will be firmly seated within the recess. As will be appreciated from FIG. 1, the radial thickness of the dielectric sheath material at the flange 24, boss 32 and conical portion 22 adjacent recess 34 is considerably greater than the normal radial thickness as represented at location 14 in FIG. 1. Even at the recess 34 the radial dimension of the sheath material is approximately equal to that at 14 and thus the presence of the sealing structure 18 does not reduce the dielectric character of the conductor at the sealing structure, but rather improves it, since the O-ring 36 is also dielectric.

A panel or plate through which a conductor constructed in accord with the invention is inserted is represented at 38 in FIG. 3. This plate may constitute the wall of a housing or casing, and in actual practice of one form of the inventive concept the plate constitutes the end of a submergible sonobuoy casing containing electronic equipment. In such an installation the area below the plate 38 is to be rendered watertight with respect to the environment above the plate, which is submerged below the water's surface. The plate 38 includes a hole 40 extending therethrough; hole 40 consists of a smaller diameter portion 42 intersecting a larger diameter portion 44 by means of the intermediate conical portion 46. The diameter of the enlarged portion 44 is substantially equal to the diameter of the flange 24 whereby the conductor 10 may be assembled in the hole 40 in the manner shown in FIG. 3. In mounting the conductor the end 16 is inserted through the hole 40 until the sealing ring 36 engages the hole portion 46. The hole portion 42 is of sufficient diameter to receive the conical portion 22, and thus engagement of the seal ring 36 with the hole portion 46 is accomplished without interference with the hole portion 42. As the flange 24, and O-ring seal 36, are of a maxmium diameter approximately equal to the hole portion 44, the flange and O-ring may be readily received within the large hole portion, and in engagement therewith.

The depth of the hole portion 44 is such that the flange radial surface 30 will be substantially aligned with the plate surface 48 when the conductor sealing structure is fully located within the hole 40.

A clamping plate 50 is mounted upon the plate 38 and is of a flat configuration having a circular hole 52 defined therein. The hole 52 is of a diameter only slightly larger than the diameter of the boss 32, and the clamp plate is disposed over the conductor to receive the boss within the hole. Screws 54 attach the clamp plate 50 to the support plate 38, and in this manner the clamp bears upon the flange surface 30 maintaining the electrical conductor in proper relation to the hole 40 in order to insure sealing between the sealing structure components and the plate 50.

As the diameter of the flange 24 is greater than that of the boss 32 the overlapping of the clamp 50 upon the surface 30 provides a firm mechanical interconnection preventing withdrawal of the conductor from the hole 40. Rather than the clamp plate having a hole 52 defined therein, it is within the scope of the invention to form the clamp such that a partial hole or clamp plate edge overlies the flange surface to prevent axial withdrawal of the conductor from the plate hole.

The close interrelationship between the flange 24 and the hole portion 44; and between the O-ring 36, the hole portions 44 and 46, and the flange; produces a most effective air and fluid seal between the plate 38 and the electrical conductor 10 without imposing any bending or deforming forces upon the conductor. As will be appreciated from the drawings, the size and dimension of the conductor sealing structure is such as to be only slightly greater than the normal dimension of the electrical conductor, and thus a plurality of electrical conductors may be located adjacent each other in extending through a common plate having a plurality of holes 40 defined therein and where the clamp plate 50 includes a plurality of holes 52.

When it is desired to remove the conductor from the plate 38, the screws 54 are removed, permitting the electrical conductor to be removed from the hole 40 by an upward axial displacement of the conductor relative to the supporting plate. The conductor may be replaced in the hole 40, and reclamped, and removed many times without adversely affecting the efficiency of the sealed interconnection.

As indicated at 56 in FIG. 3, the portion adjacent the conductor end 16 may be stripped of the thin film of dielectric sheath material in order to permit soldering or other interconnection with electrical circuitry located below plate 38, not shown.

In the disclosed embodiment, it is preferred that an annular O-ring seal 36 be utilized as shown. However, it is within the scope of the invention to dispense with the O-ring seal and solely employ the flange 24 for sealing purposes. In such event, the hole 40 would be modified to conform to the axial dimension of the flange 24 such that the axial dimension of the portion 44 would substantially correspond to the axial dimension of the flange to insure engagement of the lower portion of the flange, i.e., surface 26, with the transversely disposed surface 46 of the hole interconnecting the portions 42 and 44.

The method of producing an electrical conductor having sealing structure in accord with the invention is described with respect to FIGS. 4 through 6. FIG. 4 represents a two part mold or die 58 having an upper part 60, and a lower part 62, the parting line being represented at 64. The mold includes a cavity 66 having a cross-sectional configuration similar to that desired for the finished electrical conductor. Conical surfaces 68 are intended to form the conductor surface 22, the annular groove 34 is defined by the annular inwardly projecting ridge 70, the annular recess 72 defines the flange 24, and the boss 32 is defined by the cylindrical cavity portion 74.

The mold 58 includes a cylindrical opening 76 coaxially aligned with the cavity 66 and of a diameter only slightly greater than the diameter of the conductor sheath in the normal state. At the other end of the mold a concentric cylindrical passage 78 is defined by the mold parts which is of a diameter less than the normal diameter of the sheath 14, but is slightly greater than the diameter of the metallic core 12.

Prior to inserting the end 16 of an electric wire having a sheath defined thereon of uniform radial wall thickness into the opening 76, the end region of the electrical conductor is heated, such as by hot air, to a temperature to render a significant axial portion of the sheath material plastic, flowable, and moldable. Of course, such a change of character of the usually hardenerd sheath is due to the thermoplastic nature thereof. The sheath need not be heated to the point that it begins to melt or drip, but is heated to a degree which permits the sheath material to flow in the manner described below.

Once the electrical conductor sheath material is adequately heated, the end 16 thereof is rapidly inserted into the opening 76, through the cavity 66, and into the reduced diameter passage 78. As the conductor is moved to the right, FIG. 5, the edges 80 of the passage 78 will prevent most of the sheath material surrounding the core 12 from entering the passage causing a build-up of the sheath material in the cavity portion defined by the mold surface 68. Such a build-up of sheath material in the mold cavity continues as the conductor is moved to the right, and such movement of the conductor is continued until the sheath material being accumulated to the left of the passage 78 completely fills the mold cavity 66 to form the desired configuration for the electrical conductor sealing structure 18. FIG. 5 illustrates the condition of the sheath material when the mold cavity is practically filled therewith, and FIG. 6 indicates the completion of the formation when the mold is completely filled with the sheath material and movement of the conductor to the right has ceased.

After the mold cavity is completely filled with the sheath material, and after sufficient cooling has taken place so that the molded sheath material will retain its shape, the mold halves are parted, and the conductor will have the form shown in FIG. 1. In order to prepare the preferred embodiment of the electrical conductor for use, it is necessary only to slip an O-ring 36 over the end 16 of the conductor and onto the recess 34.

It will be appreciated from the aforedescribed that the invention results in a very economically producible feedthrough electrical conductor which may be effectively sealingly mounted to a plate or panel through which it extends. The method of forming the sealing structure upon the conductor as described with respect to FIGS. 4 through 6 requires only a few seconds of time, and the ability to assemble and disassemble the conductor to the supporting plate without affecting the efficiency of the sealing connection, and without requiring unusual skills, renders the invention practical for many installations. The presence of radial thicknesses of sheath material about the core 12 at configuration 22 adjacent hole portion 42, recess 34, flange 24 and boss 32 equal to, or greater than the normal radial thickness of the sheath insures electrical insulation between the core 12 and the plate 38 and clamp 50, and the association of the flange 24 with the hole portion 44 prevents lateral movement that might produce chaffing.

It is appreciated that various modifications to the described embodiment may be apparent to those skilled in the art without departing from the spirit and scope of the invention.

I claim,

1. The method of forming sealing structure on an electrical conductor consisting of an elongated metallic conductor core encased within a thermoplastic, dielectric sheath of a normal substantially uniform radial thickness comprising the steps of, heating that portion of the sheath upon which the sealing structure is to be formed to a temperature rendering the sheath material flowable and moldable, axially displacing said sheath material relative to the adjacent core to accumulate a mass of sheath material about the core having a radial thickness greater than the sheath normal radial thickness, molding said mass of sheath material within a mold while in the heated and moldable state to define sealing structure radially extending beyond the normal sheath radial thickness, cooling the molded mass to retain the molded shape of said sealing structure, and removing the mold from the molded mass.

2. The method of forming sealing structure on an electrical conductor as in claim 1 wherein said step of axially displacing said heated sheath material comprises axially inserting the heated end of the electrical conductor into a mold cavity, the conductor end being received within an opening beyond the cavity having a diameter larger than the core and smaller than the sheath normal diameter whereby insertion of the conductor into the mold causes a mass of sheath material to accumulate within the mold cavity.

3. The method of forming sealing structure on an electrical conductor as in claim 1 wherein the step of molding said mass of sheath material to define sealing structure includes forming a radially extending shoulder on said electrical conductor from said sheath material and an annular recess adjacent said shoulder adapted to receive a resilient O-ring.

References Cited

UNITED STATES PATENTS

| | | | |
|---|---|---|---|
| 1,956,357 | 4/1934 | Leib | 174—152 R |
| 2,417,552 | 3/1947 | Iker et al. | 174—153 R |
| 2,563,829 | 8/1951 | Fitzgerald et al. | 174—23 R |
| 2,651,672 | 9/1953 | Ivanoff | 174—152 R |
| 2,838,596 | 6/1958 | Foord | 174—152 R |
| 2,938,067 | 5/1960 | Werner | 174—70 S |
| 3,043,903 | 7/1962 | Keane et al. | 174—152 R |
| 3,495,028 | 2/1970 | Tutthill | 174—153 R |

FOREIGN PATENTS

| | | | |
|---|---|---|---|
| 1,171,111 | 9/1958 | France | 174—152 R |
| 608,722 | 9/1948 | Great Britain | 174—152 R |
| 876,851 | 9/1961 | Great Britain | 174—152 R |

LARAMIE E. ASKIN, Primary Examiner

U.S. Cl. X.R.

174—152 R; 264—323